(12) United States Patent
Lin (10) Patent No.: US 11,555,880 B2
(45) Date of Patent: Jan. 17, 2023

(54) INTELLIGENT BED MONITORING DEVICE AND METHOD THEREOF

(71) Applicants: Wen-Hung Lin, Kaohsiung (TW); Ai. Sleep Co., Ltd., Taipei (TW)

(72) Inventor: Wen-Hung Lin, Kaohsiung (TW)

(73) Assignees: Wen-Hung Lin, Kaohsiung (TW); AI. SLEEP CO., LTD., Taipei (TW)

( * ) Notice: Subject to any disclaimer, the term of this patent is extended or adjusted under 35 U.S.C. 154(b) by 295 days.

(21) Appl. No.: 16/902,809

(22) Filed: Jun. 16, 2020

(65) Prior Publication Data
US 2021/0124008 A1    Apr. 29, 2021

Related U.S. Application Data

(60) Provisional application No. 62/927,403, filed on Oct. 29, 2019.

(51) Int. Cl.
*G01S 3/808*    (2006.01)
*G05B 15/02*    (2006.01)

(52) U.S. Cl.
CPC ............ *G01S 3/8083* (2013.01); *G05B 15/02* (2013.01)

(58) Field of Classification Search
CPC ..... G01S 3/8083; G05B 15/02; A47C 31/123; A47C 20/04; A61B 5/4812; A61B 5/4818
See application file for complete search history.

(56) References Cited

U.S. PATENT DOCUMENTS

| | | | |
|---|---|---|---|
| 2008/0120784 A1* | 5/2008 | Warner | A61B 5/0002 345/184 |
| 2019/0200777 A1* | 7/2019 | Demirli | A61B 5/11 |

* cited by examiner

*Primary Examiner* — Mohammad Ali
*Assistant Examiner* — Sheela Rao
(74) *Attorney, Agent, or Firm* — Muncy, Geissler, Olds & Lowe, P.C.

(57) ABSTRACT

An intelligent bed monitoring device and method are provided in this disclosure. The device is applied to a bed frame, and the bed frame includes a first bed board and a second bed board. The intelligent bed monitoring device includes a plurality of audio sensors, a processor and a controlling module. The processor is electrically connected to the audio sensors and the controlling module. The audio sensors are configured to detect a plurality of audio signals. The processor is configured to receive the audio signals, and calculate an audio source direction according to the audio signals. The controlling module is configured to control one of the first bed board and the second bed board according to the audio source direction to adjust one of the first bed board and the second bed board into a plurality of modes.

10 Claims, 8 Drawing Sheets

INTELLIGENT BED MONITORING DEVICE AND METHOD THEREOF

CROSS REFERENCE TO RELATED APPLICATION

This application claims the benefit of filing date of U.S. Provisional Application Ser. No. 62/927,403 filed on Oct. 29, 2019. The entirety of said Provisional Application is incorporated herein by reference.

BACKGROUND OF THE INVENTION

1. Field of the Invention

The present invention relates to a monitoring device and method. More particularly, the present application relates to an intelligent bed monitoring device and method thereof.

2. Description of Related Art

Generally, everyone needs adequate sleep, however, partial of people may suffer from sleep apnea syndrome, which causes them to have insomnia, daytime naps, fatigue, and cardiac arrhythmia. Therefore, an intelligent bed monitoring device and monitoring device method for improving the user's sleep quality is required.

SUMMARY OF THE INVENTION

An aspect of the disclosure is to provide an intelligent bed monitoring device. The intelligent bed monitoring device is applied to a bed frame, and the bed frame comprises a first bed board and a second bed board, the intelligent bed monitoring device includes a plurality of audio sensors, a processor and a controlling module. The processor is electrically connected to the plurality of audio sensors and the controlling module. The plurality of audio sensors are configured to detect a plurality of audio signals. The processor is configured to receive the plurality of audio signals and calculate an audio source direction according to the plurality of audio signals. The controlling module is configured to control one of the first bed board and the second bed board according to the audio source direction to adjust one of the first bed board and the second bed board into a plurality of modes.

Another aspect of the disclosure is to provide an intelligent bed monitoring method for applying to an intelligent bed monitoring device, wherein the intelligent bed monitoring device is applied to a bed frame, and the bed frame comprises a first bed board and a second bed board, wherein the intelligent bed monitoring method includes operations of: detecting and generating a plurality of audio signals by a plurality of audio sensors; receiving the plurality of audio signals, and calculating an audio source direction according to the plurality of audio signals by a processor; and controlling one of the first bed board and the second bed board according to the audio source direction to adjust one of the first bed board and the second bed board into a plurality of modes.

The foregoing and other objects, advantages, and novel features of the invention will become more apparent from the following detailed description when taken in conjunction with the accompanying drawings.

DETAILED DESCRIPTION OF THE PREFERRED EMBODIMENT

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
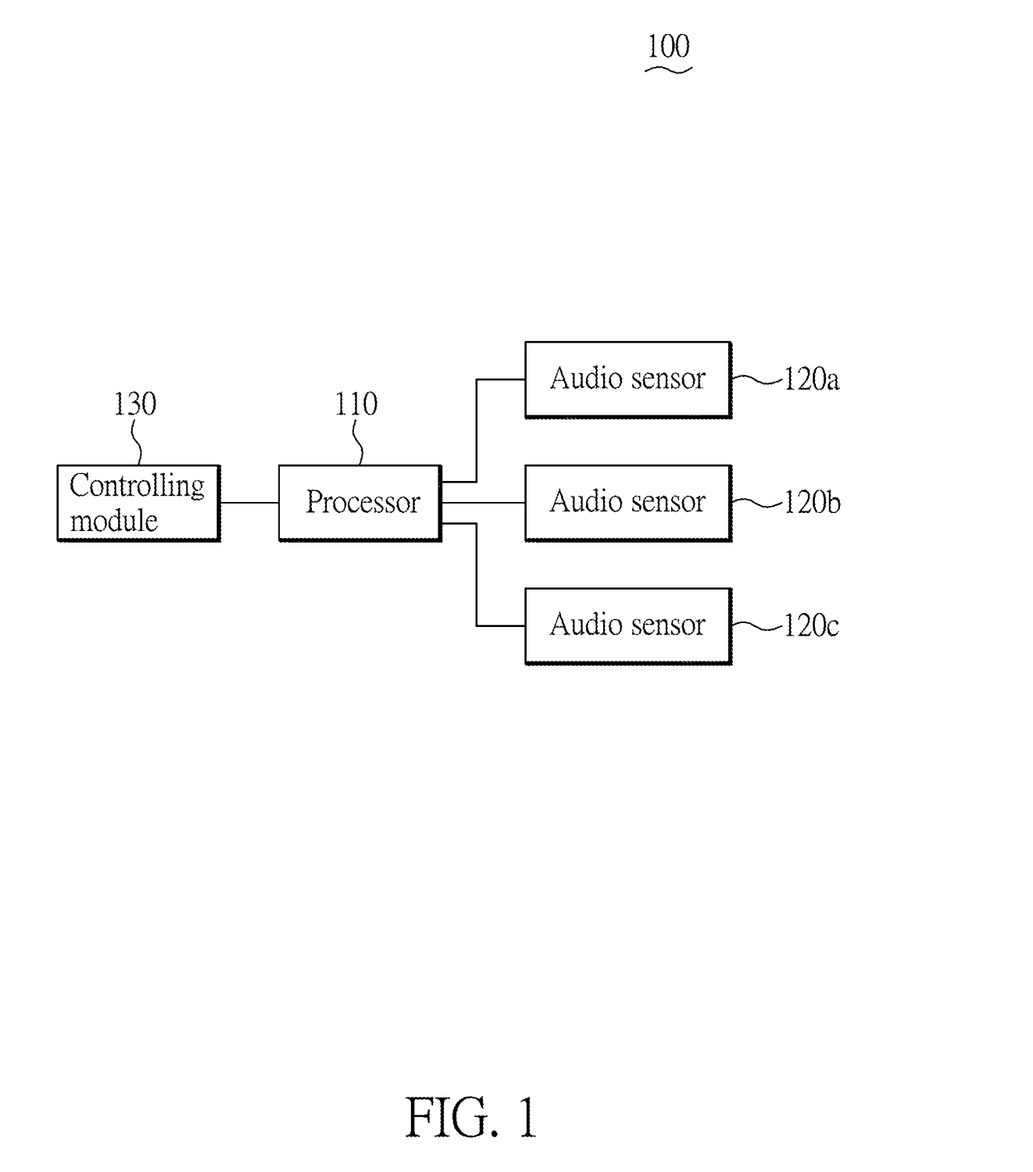
FIG. 1 is a functional block diagram illustrating an intelligent bed monitoring device according to an embodiment of the disclosure.

Reference is made to FIG. 1, which is a functional block diagram illustrating an intelligent bed monitoring device 100 according to an embodiment of the disclosure. As shown in FIG. 1, the intelligent bed monitoring device 100 includes a processor 110, a plurality of audio sensors 120a, 120b and 120c, and a controlling module 130. The processor 110 is electrically connected to the audio sensors 120a, 120b and 120c and the controlling module 130.

In the embodiments of the disclosure, the processor 110 can be implemented by a microcontroller, a microprocessor, a digital signal processor, an application specific integrated circuit, a central processing unit, a control circuit and/or a graphics processing unit. The audio sensors 120a, 120b and 120c can be implemented by a microphone or other device which can detect the audio signal. The controlling module 130 can be implemented by a motor or a quiet motor.

Figure 2A:
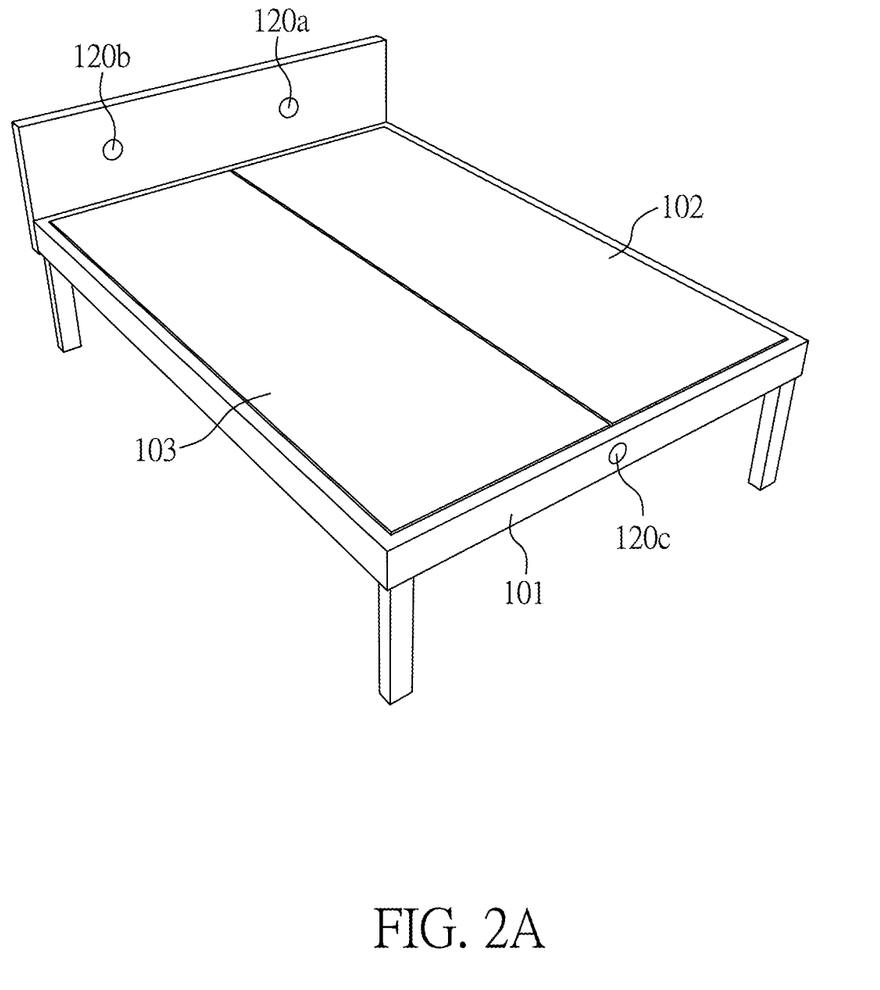
FIG. 2A is a schematic diagram of the intelligent bed monitoring device installed on the bed frame according to an embodiment of the disclosure.

Reference is made to FIG. 2A, which is a schematic diagram of the intelligent bed monitoring device 100 installed on the bed frame according to an embodiment of the disclosure. As shown in FIG. 2A, the bed body includes the bed frame 101 and the bed boards 102 and 103. The audio sensors 120a, 120b and 120c are installed around the bed frame 101 to detect user's voice or the ambient audio. For example, the audio sensors 120a, 120b and 120c are configured to receive user's snoring during sleep, and the processor 110 is configured to determine user's sleep stages (e.g. light sleep, deep sleep and REM sleep). The audio sensors 120a, 120b and 120c are configured to receive the ambient audio, such as car noise, human voice or low frequency noise when the machine is running.

Afterwards, the controlling module 130 is disposed on the bottom of the bed boards 102 and 103 (not shown in FIG. 2A), and the controlling module 130 is configured to adjust one of the bed board 102 and 103 into a multiple of modes. It is noticed that, the processor is not shown in the FIG. 2A. However, the audio sensors 120a, 120b and 120c and the controlling module 130 are electrically connected to the processor 110, for easy understanding, the connection relationship is not shown in FIG. 2A figure. However, the disclosure is not limited thereto.

Figure 2B:
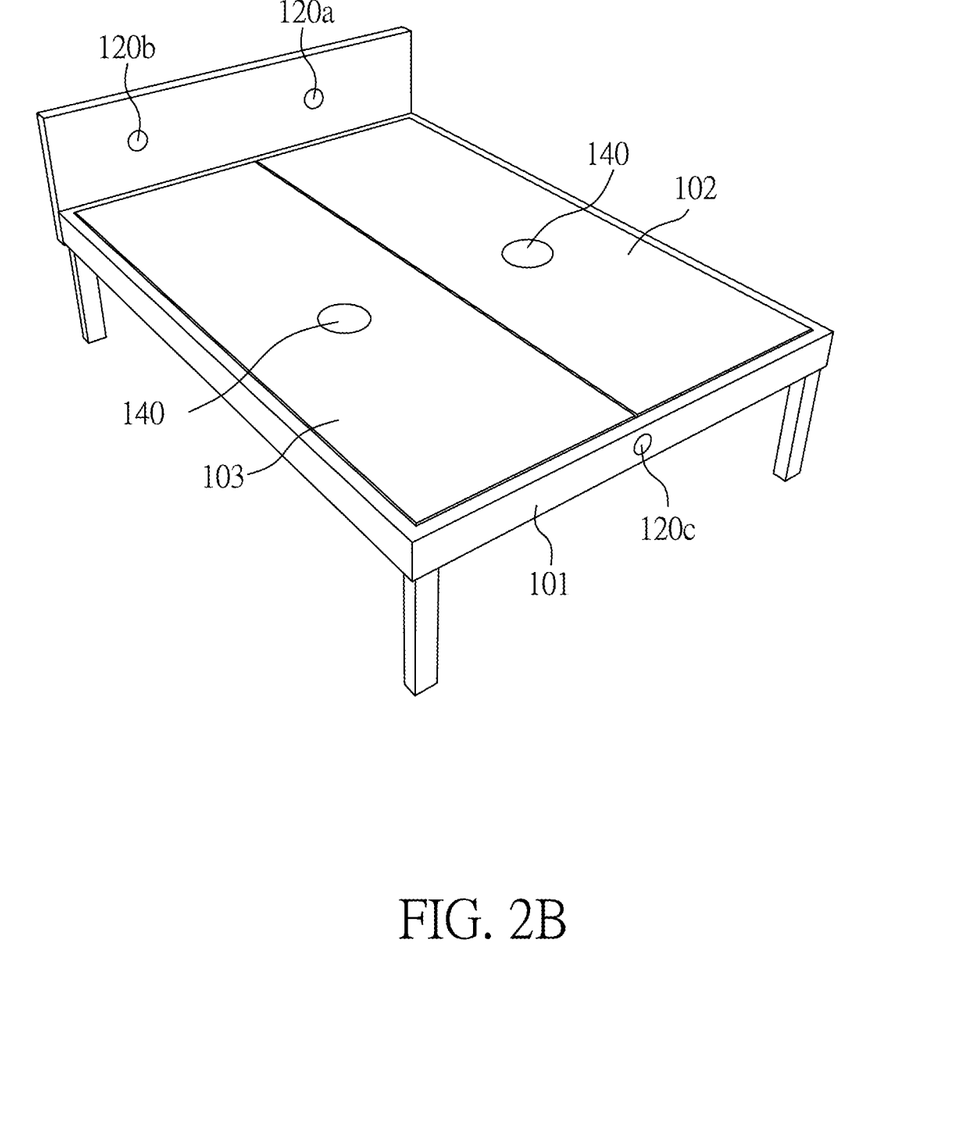
FIG. 2B is a schematic diagram of the intelligent bed monitoring device installed on the bed frame according to an embodiment of the disclosure.

In another embodiment, reference is made to FIG. 2B, which is a schematic diagram of the intelligent bed monitoring device 100 installed on the bed frame according to an embodiment of the disclosure. As shown in FIG. 2B, the intelligent bed monitoring device 100 further includes a pressure sensor 140, and the pressure sensor 140 is electrically connected to the processor 110. The pressure sensor 140 is disposed on the bed boards 102 and 103, respectively (the mattresses are disposed on the bed boards 102 and 103). It is noticed that, the bed size as shown in FIG. 2B is double size, and thus the pressure sensor 140 is disposed on the bed boards 102 and 103, respectively to detect the physiological signals of different users. In another case, if the bed size is single size, the pressure sensor 140 can be disposed on the center of the bed board.

Figure 3:
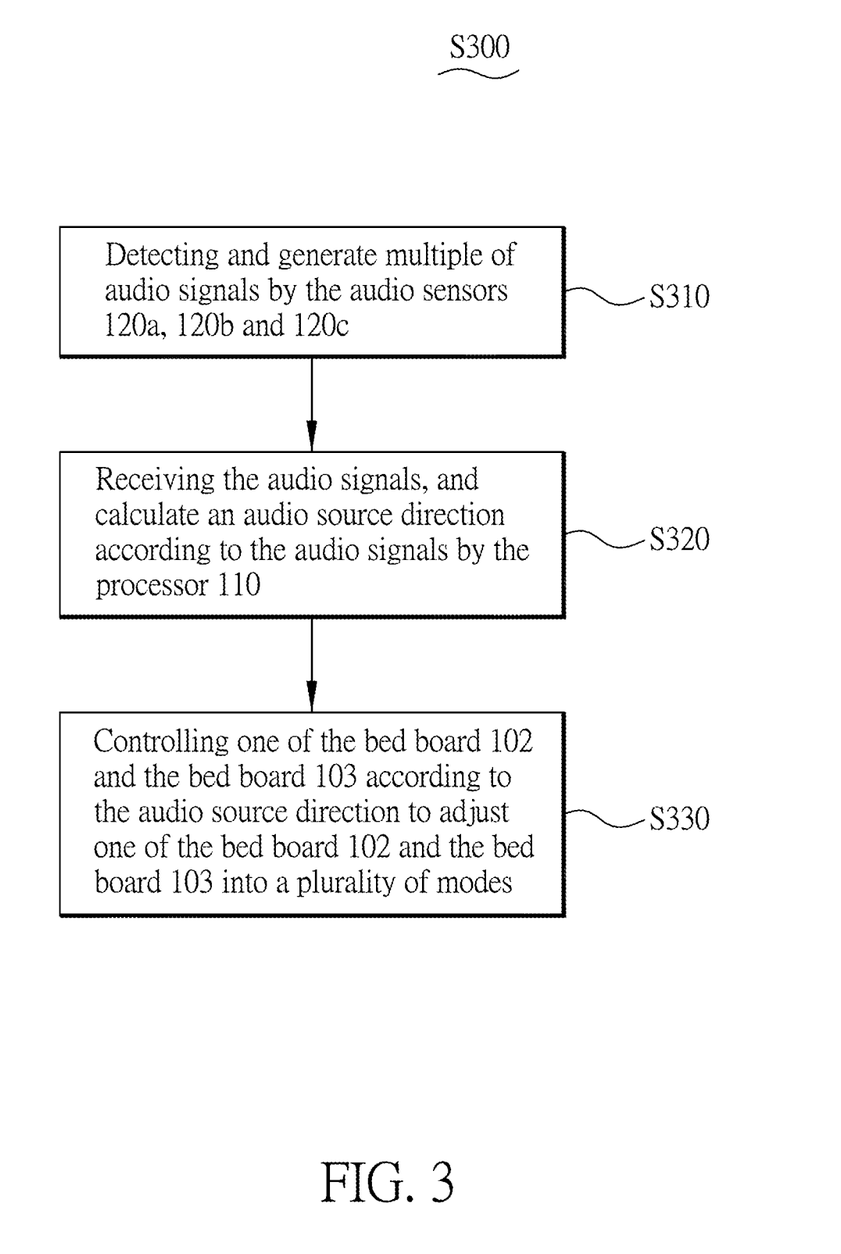
FIG. 3 is a flow diagram illustrating an intelligent bed monitoring method according to an embodiment of this disclosure.

Reference is made to FIG. 3, which is a flow diagram illustrating an intelligent bed monitoring method 300 according to an embodiment of this disclosure. In the embodiment, the intelligent bed monitoring method 300 can be applied to the intelligent bed monitoring device 100 of FIG. 1. The processor 110 can be utilized to detect and generate multiple of audio signals, calculate an audio source direction according to the audio signals, and control the bed board 102 or the bed board 103 according to the audio source direction.

Afterwards, the intelligent bed monitoring method 300 firstly executes step S310 to detect and generate multiple of audio signals by the audio sensors 120a, 120b and 120c. As shown in FIG. 2A, the audio sensor 120a is configured to detect the audio signals from the user lying on the bed board 102, such as breathing or snoring form the user. The audio sensor 120b is configured to detect the audio signals from another user lying on the bed board 103, and the audio sensor 120c is configured to detect the ambient audios around the bed frame 101, such as car noise, human voice or low frequency noise when the machine is running.

Figure 4:
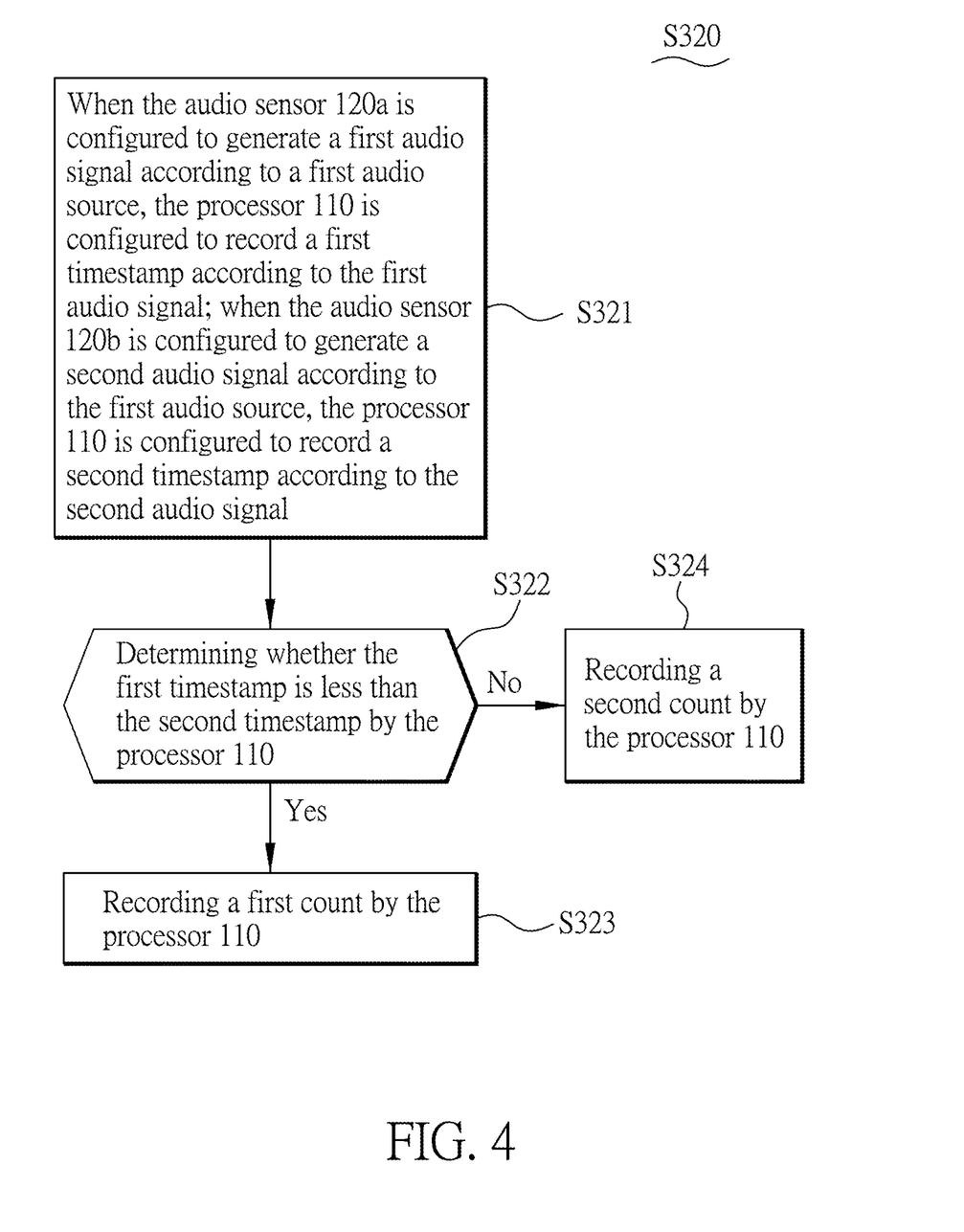
FIG. 4 is a flow diagram illustrating step S320 according to an embodiment of this disclosure.
Figure 5A:
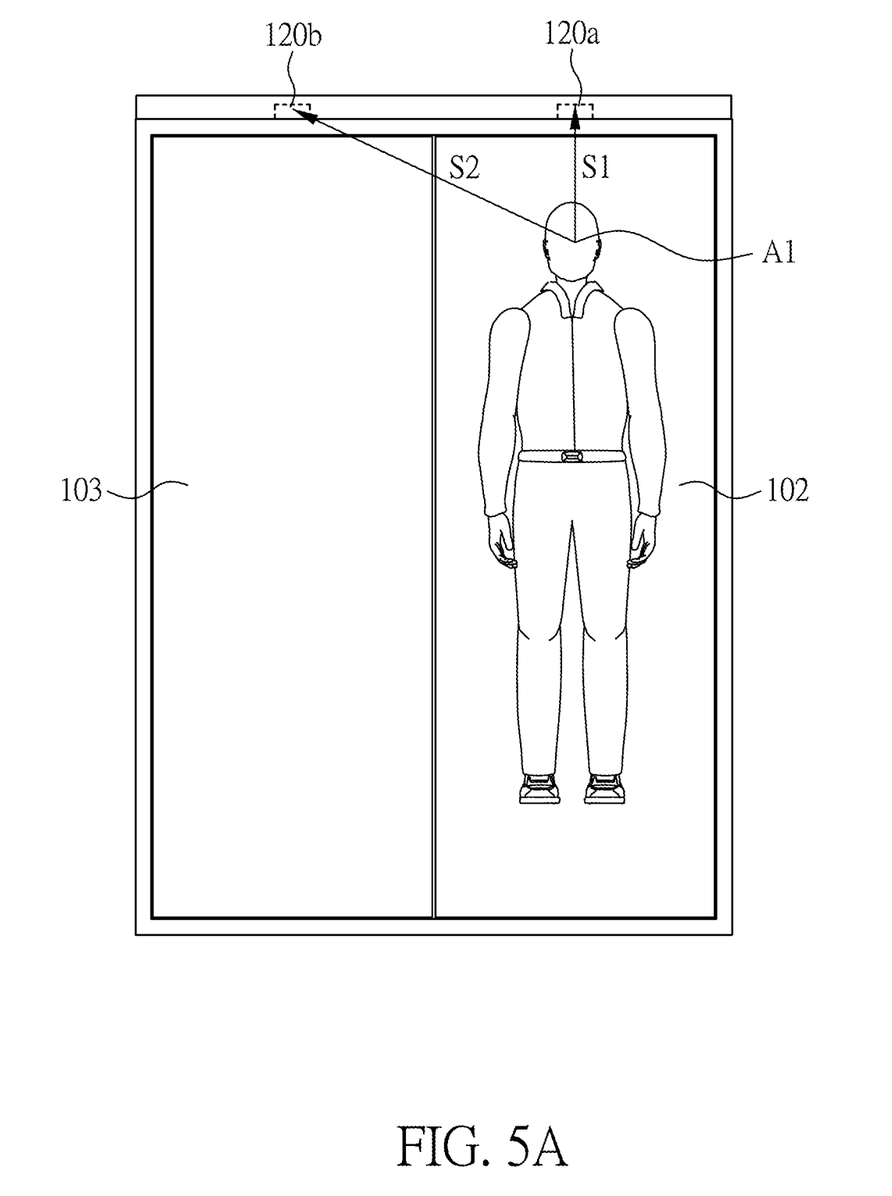
FIGS. 5A and 5B are an operation diagram illustrating the intelligent bed monitoring device according to an embodiment of this disclosure.
Figure 5B:
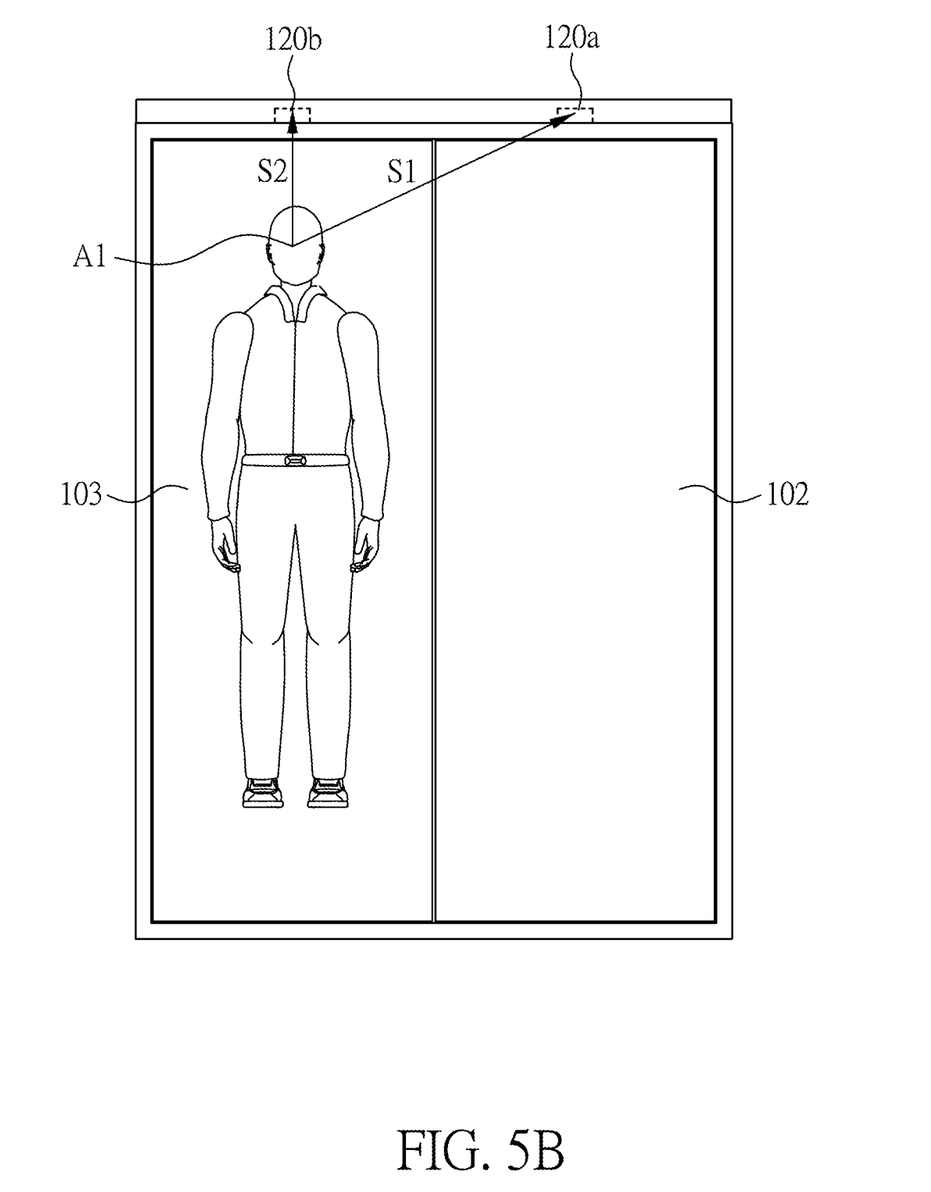

Afterwards, the intelligent bed monitoring method 300 executes step S320 to receive the audio signals, and calculate an audio source direction according to the audio signals by the processor 110. The step S320 further includes steps S321~S324, reference is made to FIG. 4 and FIGS. 5A and 5B. FIG. 4 is a flow diagram illustrating step S320 according to an embodiment of this disclosure, and FIGS. 5A and 5B are an operation diagram illustrating the intelligent bed monitoring device 100 according to an embodiment of this disclosure. The intelligent bed monitoring method 300 further executes step S321 when the audio sensor 120a is configured to generate a first audio signal according to a first audio source, the processor 110 is configured to record a first timestamp according to the first audio signal; when the audio sensor 120b is configured to generate a second audio signal according to the first audio source, the processor 110 is configured to record a second timestamp according to the second audio signal.

Afterwards, as shown in FIG. 5A, the user lies on the bed board 102 and generates the audio signals S1 and S2. It will be seen as an audio source A1 that the user lies on the bed board 102 and makes noise (e.g. snoring) continuously. When the audio sensor 120a receives the audio signal S1 according to the audio source A1, the processor 110 is configured to record a first timestamp according to the audio signal S1. When the audio sensor 120b receives the audio signal S2 according to the audio source A1, the processor 110 is configured to record a second timestamp according to the audio signal S2.

Afterwards, it is noticed that the processor 110 determines whether the audio intensity of the audio signals S1 and S2 detected by the audio sensors 120a and 120b exceeds a certain threshold. In other words, the processor 110 determines the volume of the audio signals. Only when the audio intensity exceeds the certain threshold, the processor 110 records the first timestamp and the second timestamp.

Afterwards, the intelligent bed monitoring method 300 further executes step S322 to determine whether the first timestamp is less than the second timestamp by the processor 110. If the first timestamp is less than the second timestamp, the intelligent bed monitoring method 300 executes step S323, to record a first count by the processor 110. The processor 110 is configured to determine the distance relationship between the audio source A1 and the audio sensors 120a and 120b by comparing the first timestamp and the second timestamp to calculate the audio source direction. Based on aforesaid embodiment, the processor 110 determines the first timestamp recorded according to the audio signal S1 is earlier than the second timestamp recorded according to the audio signal S2, and thus the processor 110 learns that the distance between the audio sensor 120a and the audio source A1 is shorter than the distance between the audio sensor 120b and the audio source A1, and thereby concludes the audio source direction (the user is located on the bed board 102).

Similarly, as shown in FIG. 5B, if the second timestamp is less than the first timestamp, the intelligent bed monitoring method 300 executes step S324, to record a second count by the processor 110. In the embodiment, the processor 110 determines the second timestamp recorded according to the audio signal S2 is earlier than the first timestamp recorded according to the audio signal S1, and thus the processor 110 learns that the distance between the audio sensor 120b and the audio source A1 is shorter than the distance between the audio sensor 120a and the audio source A1, and thereby concludes the audio source direction (the user is located on the bed board 103).

It is noticed that, the audio sensor 120c is configured to generate third audio signal according to another audio source, and the processor 110 is utilized the content of the third audio signal to adjust the audio signal S1 and S2. For example, the audio sensor 120c is configured to detect the ambient audio to generate the third audio signal and transmit the third audio signal to the processor 110. The processor 110 is configured to subtract the first audio signal (e.g. the audio signal S1) from the third audio signal to obtain the adjusted first audio signal, and the processor 110 is configured to subtract the second audio signal (e.g. the audio signal S2) from the third audio signal to obtain the adjusted second audio signal. In this way, it can be utilized the ambient audio received by the audio sensor 120c to perform a noise reduction processing for the first audio signal and the second audio signal to improve the accuracy of subsequent operations.

Afterwards, the intelligent bed monitoring method 300 executes step S330, to control one of the bed board 102 and the bed board 103 according to the audio source direction to adjust one of the bed board 102 and the bed board 103 into a plurality of modes. Based on aforesaid embodiment, when the first count is larger than a threshold, the processor 110 is configured to adjust the bed board 102. In another cases, when the second count is larger than the threshold, the processor 110 is configured to adjust the bed board 103.

Afterwards, the first count is larger than the threshold value means that the audio signal S1 and S2 emitted from the audio source A1 is repeatedly detected. Is this case, it can be determined that the user lying on the bed board 102 emits a continuous sound (such as snoring), and thus the position of the uvula palatina can be changed by adjusting the angle of the bed board to widen the space in the respiratory tract and make breathing easier. It can achieve the effect of reducing the sound volume of breathing during sleep.

It is noticed that, the threshold is used to reduce the probability of misjudgment. Therefore, when the first timestamp less than the second timestamp occurs a certain frequencies, the processor 110 is configured to transmit the control signal to the controlling module 130 to adjust the bed board 102. Similarly, when the second timestamp less than the first timestamp occurs the certain frequencies, the processor 110 is configured to transmit the control signal to the controlling module 130 to adjust the bed board 103.

In another embodiment, the intelligent bed monitoring device 100 further includes the pressure sensor 140, and the pressure sensor 140 is configured to detect a vibration signal and transmit the vibration signal to the processor 110. In the embodiment, the processor 110 is configured to analyze the vibration signal and generate multiple of feature points, and the processor 110 transmits a controlling signal to the audio sensors 120a, 120b and 120c according to the feature points, and the audio sensors 120a, 120b and 120c are enabled to detect the audio signals. It is noticed that, there is a time period between the feature points and the time period means the respiration cycle.

Afterwards, the processor 110 is configured to analyze user's heartbeat and breathing through the vibration signal detected by the pressure sensor 140 to obtain the physiological signals (e.g. the heartbeat signal and the breathing signal) of the user during sleep. In this case, the audio sensors 120a, 120b and 120c are enabled by user's heartbeat signal and breathing signal, so that the audio sensors 120a, 120b and 120c can detect the audio signals according to the breathing frequency of human. Therefore, the technique of detecting sleep breathing can be more accurate.

It is noticed that, the physiological signals (e.g. the heartbeat signal and the breathing signal) usually have a fixed frequency. The processor 110 analyzes the feature points (e.g. the wave peaks and the wave hollows of the signals) of the physiological signal according to the algorithm, and utilizes the feature points to calculate the breathing frequency of user. Thus, when the user inhales, the audio sensors can be used to detect the inhalation sound (i.e. the snoring) of the user during sleep.

Figure 6:
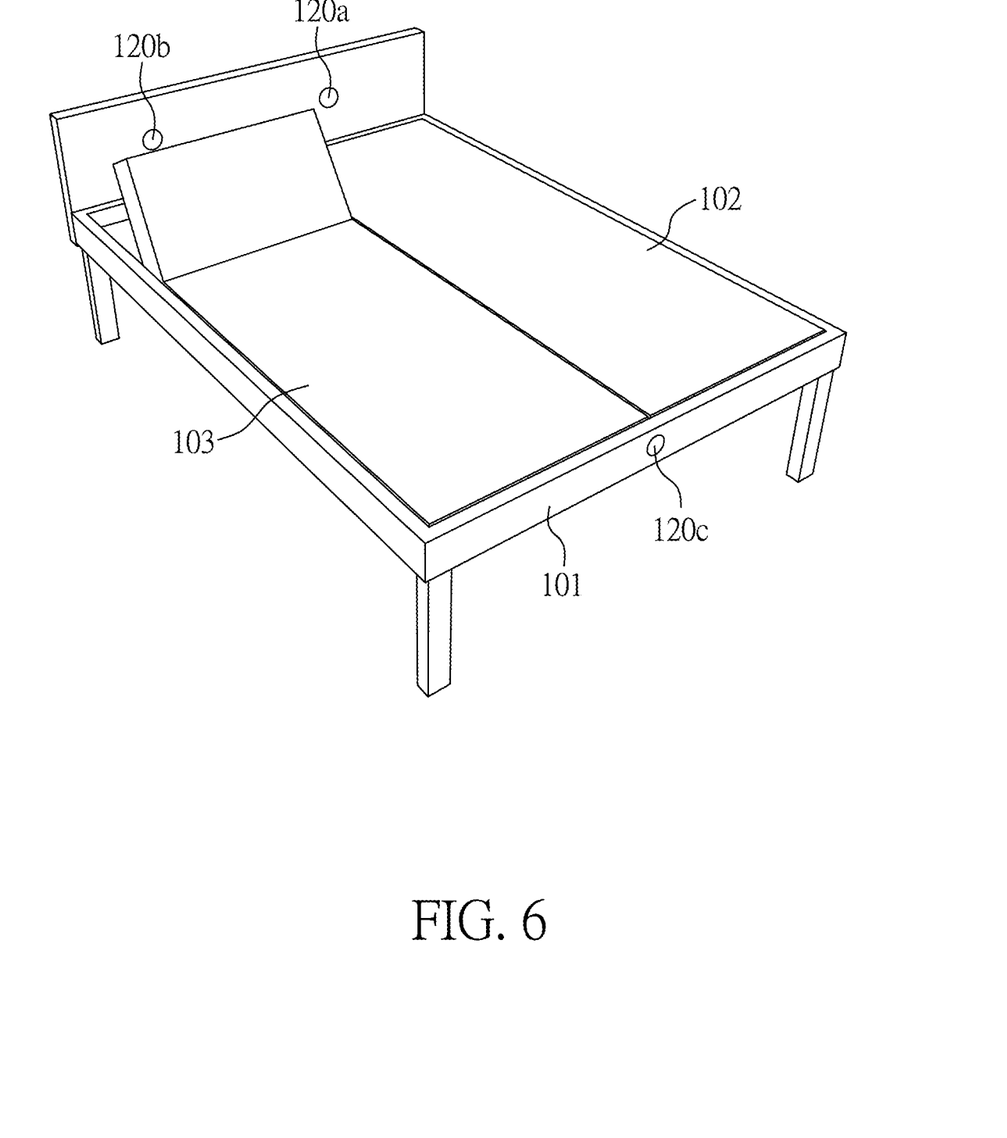
FIG. 6 is a schematic diagram of the modes of bed board according to an embodiment of the disclosure.

Afterwards, reference is made to FIG. 6, which is a schematic diagram of the modes of bed board according to an embodiment of the disclosure. As shown in FIG. 6, when the second count is larger than the threshold, the processor 110 is configured to drive the controlling module 130 to upraise the bed board 103 and adjust the sleeping position of the user. Similarly, when the first count is larger than the threshold, the processor 110 is configured to drive the controlling module 130 to upraise the bed board 102 and adjust the sleeping position of another user. When the sound volume of breathing detected by the audio sensors 120a and 120b is decreasing, the processor 110 may continue to maintain current position of the bed board or after a while adjust the bed board to a lay flat mode. However, if the audio sensors 120a and 120b detect the sound volume of breathing continuously, the processor 110 can drive the controlling module 130 to upraise the bed board and change the sleeping position of the user.

Based on aforesaid embodiments, the intelligent bed monitoring device and method are capable of providing a method that can collect physiological data of the user while sleeping; utilizing the audio signals to detect user's breathing during sleep, and further adjusting the bed board to change the sleeping position of the user. In some embodiments, this disclosure is able to widen the space in the respiratory tract and achieve the effect of reducing the sound volume of breathing during sleep.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An intelligent bed monitoring device for applying to a bed frame, and the bed frame comprises a first bed board and a second bed board, the intelligent bed monitoring device comprising:
   a pressure sensor being configured to detect a vibration signal;
   a first audio sensor disposed on the bed frame and configured to generate a first audio signal according to a first audio source;
   a second audio sensor disposed on the bed frame and configured to generate a second audio signal according to the first audio source;
   a processor electrically connected to the pressure sensor, the first audio sensor and the second audio sensor, being configured to receive the vibration signal from the pressure sensor, analyze the vibration signal to generate a plurality of feature points, and transmit a controlling signal to the first audio sensor and the second audio sensor according to the plurality of feature points to make the first audio sensor and the second audio sensor detect the first audio source based on the controlling signal, the processor being further configured to calculate an audio source direction according to the first audio signal and the second audio signal, record a first timestamp according to the first audio signal, record a second timestamp according to the second audio signal, and determine whether the first timestamp is less than the second timestamp, if the first timestamp is less than the second timestamp, the processor is configured to transmit another controlling signal to the controlling module to adjust the first bed board, and if the second timestamp is less than the first timestamp, the processor is configured to transmit the another controlling signal to the controlling module to adjust the second bed board; and
   a controlling module electrically connected to the processor, is configured to control one of the first bed board and the second bed board according to the audio source direction to adjust one of the first bed board and the second bed board into a plurality of modes.

2. The intelligent bed monitoring device of claim 1, wherein the plurality of audio sensors further comprise a third audio sensor; the third audio sensor is configured to generate a third audio signal according to a second audio source, and the processor is configured to adjust the first audio signal and the second audio signal according to content of the third audio signal, to generate adjusted first audio signal and adjusted second audio signal.

3. The intelligent bed monitoring device of claim 1, wherein when the first timestamp is less than the second timestamp, the processor is configured to record a first count, and when the first count is larger than a threshold, the processor determines that the first audio source from the first bed board is repeatedly detected, and the processor is configured to adjust the first bed board.

4. The intelligent bed monitoring device of claim 1, wherein when the second timestamp is less than the first timestamp, the processor is configured to record a second count, and when the first count is larger than a threshold, the processor determines that the first audio source from the second bed board is repeatedly detected, and the processor is configured to adjust the first bed board.

5. The intelligent bed monitoring device of claim 1, wherein there is a time period between the plurality of feature points.

6. An intelligent bed monitoring method for applying to an intelligent bed monitoring device, wherein the intelligent bed monitoring device is applied to a bed frame, and the bed frame comprises a first bed board and a second bed board, the intelligent bed monitoring method comprising:
   detecting a vibration signal by a pressure sensor and transmitting the vibration signal to a processor;
   analyzing the vibration signal to generate a plurality of feature points by the processor, and transmitting a controlling signal to the first audio sensor and the second audio sensor according to the plurality of feature points by the processor to make the first audio sensor and the second audio sensor detect a first audio source based on the controlling signal;
   generating a first audio signal according to the first audio source by the first audio sensor;
   generating a second audio signal according to the first audio source by the second audio sensor;
   receiving the first audio signal and the second audio signal by the processor, calculating an audio source direction according to the first audio signal and the second audio signal by the processor, recording a first timestamp according to the first audio signal, and recording a second timestamp according to the second audio signal;
   determining whether the first timestamp is less than the second timestamp by the processor, if the first timestamp is less than the second timestamp, the processor transmits another controlling signal to the controlling module to adjust the first bed board, and if the second timestamp is less than the first timestamp, the processor transmits the another controlling signal to the controlling module to adjust the second bed board; and
   controlling one of the first bed board and the second bed board according to the audio source direction to adjust one of the first bed board and the second bed board into a plurality of modes.

7. The intelligent bed monitoring method of claim 6, wherein the plurality of audio sensors further comprise a third audio sensor; the third audio sensor is configured to generate a third audio signal according to a second audio source, and the processor is configured to adjust the first audio signal and the second audio signal according to content of the third audio signal, to generate adjusted first audio signal and adjusted second audio signal.

8. The intelligent bed monitoring method of claim 6, wherein when the first timestamp is less than the second timestamp, the processor is configured to record a first count, and when the first count is larger than a threshold, the processor is configured to adjust the first bed board.

9. The intelligent bed monitoring method of claim 6, wherein when the second timestamp is less than the first timestamp, the processor is configured to record a second count, and when the first count is larger than a threshold, the processor is configured to adjust the first bed board.

10. The intelligent bed monitoring method of claim 6, wherein there is a time period between the plurality of feature points.

* * * * *